Jan. 16, 1951 A. G. PERKINS ET AL 2,538,652
CONTROL DEVICE FOR MILKING MACHINES
Filed June 24, 1946 2 Sheets-Sheet 1
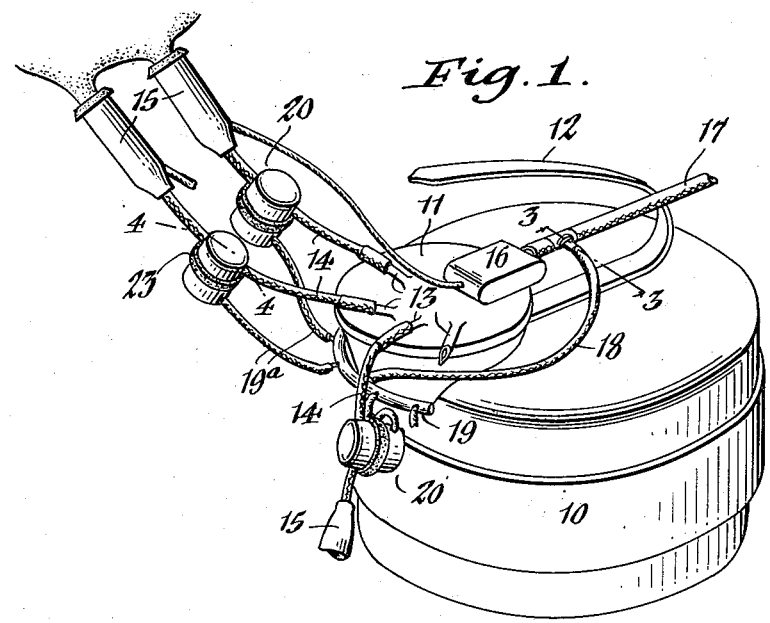
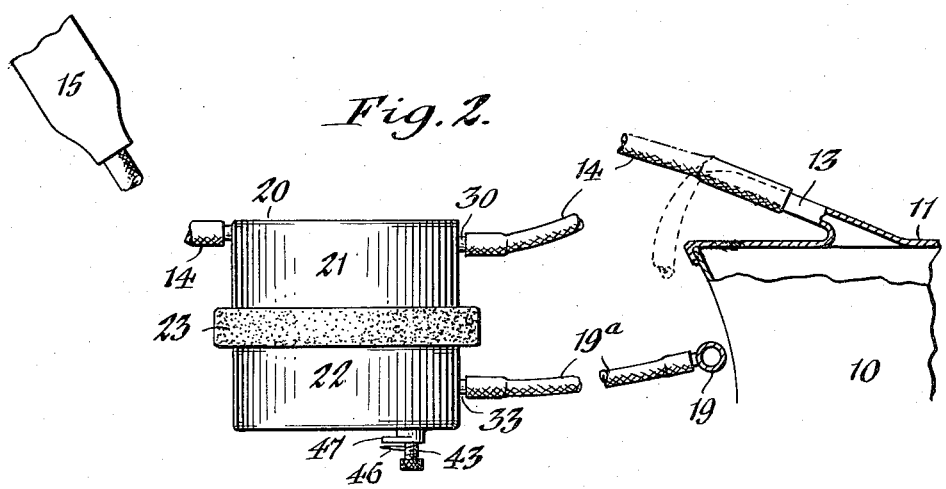
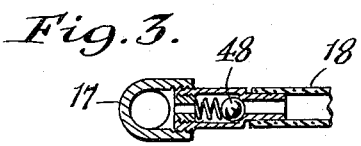

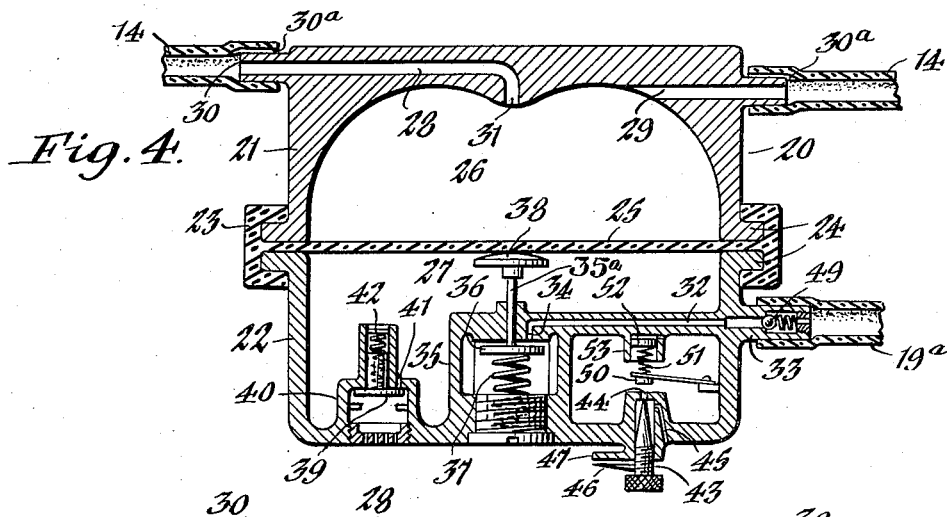

Patented Jan. 16, 1951

2,538,652

UNITED STATES PATENT OFFICE 2,538,652

CONTROL DEVICE FOR MILKING MACHINES

Albert G. Perkins, Grand Island, and Raoul Du Quette, Buffalo, N. Y.; said Du Quette assignor to said Perkins Application June 24, 1946, Serial No. 678,938

17 Claims. (Cl. 31—86)

This invention relates to certain new and useful improvements in control devices for automatically controlling the operation of milking machine.

It has for one of its objects to provide a device of this character designed to prevent over-milking and adapted to be interposed in the milk flow connections between the milk-receiving receptacle and the teat cups of a milking machine for automatically releasing the teat cups from the cow when the flow of milk is reduced to a predetermined minimum including a brief stripping period.

Another object of the invention is to provide a simple, compact and inexpensive control device which may be readily applied to present types of milking machines for automatically, effectually, and positively, and in an individual manner, releasing the teat cups from the cow at such times as the respective quarters of the cow's bag are milked dry, thereby lessening the danger of mastitis and other diseases caused by over-milking, and reducing the milking time to a minimum.

A further object of the invention is to provide individual vacuum-governed control units which are so designed and constructed as to be readily attached to or interposed in the teat cup connections of milking machines, which can be easily cleaned and are free from moving parts in the milk flow stream, and which embody adjustable means for controlling at the will of the operator or dairy attendant, the stripping time desired in the milking operation.

Other features of the invention reside in the construction and arrangement of parts hereinafter described and particularly pointed out in the appended claims.

In the accompanying drawings: Figure 1 is a perspective view of a milking machine of ordinary construction showing our control units associated therewith, two of the teat cups being in their operative position and another being in an inoperative position after having been automatically released from the cow. Figure 2 is a side elevation, partly in section, of one of the control units and the connections thereto. Figure 3 is an enlarged cross section taken on line 3—3, Figure 1. Figure 4 is an enlarged vertical cross section of one of the milk flow control units taken substantially in the plane of line 4—4, Figure 1, showing the position of the parts in their inoperative or normal position. Figure 5 is a similar sectional view with the parts shown in the position they assume at the end of a milking operation. Figure 6 is a bottom plan view, partly in section, of one of the control units.

Similar characters of reference indicate corresponding parts throughout the several views.

Referring now to the drawings, wherein we have shown our control device or controlled quarter milker applied to a pulsating type of milking machine of ordinary construction, 10 indicates the milk-receiving can or receptacle having a top or cover 11 applied thereto and adapted to be held firmly and tightly in place by the vacuum employed in the milking operation. A bail 12 is applied to the can to facilitate its handling as well as for suspending it from the cow during the milking operation. Radiating from the top of the cover are milk intake tubes 13 which are individually connected by companion flexible conduits or hose connections 14 having teat cups 15 at their free ends for detachable connection to the cow's teats. It will be noted that the mouth edge of each tube is oblique to its axis so that when a teat cup is released or disconnected from the cow, as it automatically is with our control when the companion quarter of the cow's bag has been milked out, the corresponding flexible conduit will bend or fold over the edge of the tube and thereby close off its mouth so as not to disturb the vacuum in the system or interfere with the milking operation of the other quarters of the cow's bag. Applied to the top of the cover is the pulsator 16 of the machine, the same being connected to a tube 17 communicating with the suction source, and leading from this tube is an auxiliary suction tube 18 connected to a manifold pipe 19 having individual suction tubes 19ᵃ in vacuum communication with our individual control units indicated generally by the numeral 20, which are interposed in the companion milk flow conduits 14 and through which the milk flows from the cow to the can.

Each of the control units operates individually and independently of the others to automatically cut off the vacuum to the companion quarters of the cow's bag and to cause the automatic release or dropping of the companion teat cup from the cow at such time as that quarter is milked out or finished milking, including a brief stripping period. This action results when the milk flow is reduced during the stripping period, causing a variation in the partial vacuum to which the control unit is subjected and a cutting off of the vacuum in the system to the companion teat cup as well as a shutting off of the milk line from the teat cup to such unit. It will be understood that one of these control units is operatively interposed in each teat cup connection 14 and a description of one will suffice for all.

In the preferred construction of the control unit shown in the drawings, it consists of a hollow or chambered body through which the milk flows from the cow to the can and which is subjected to the vacuum of the milking machine, being composed of opposing separable sections 21, 22 made of metal or like materials detachably joined together by a coupling ring or collar 23, the opposing ends of such sections terminating in annular flanges 24 about which the coupling ring fits. These chambered sections are divided or separated by a displaceable partition or diaphragm 25 to provide a milk flow and vacuum influenced chamber 26 and a vacuum control chamber 27. The coupling ring and diaphragm are preferably of an integral construction, being made of rubber or like flexible material, and the diaphragm is responsive to variations of vacuum pressure in the chambers and functions by its displacement as a control element in governing the vacuum in such chambers as well as the flow of milk through the chamber as it is drawn from the cow to the can 10. The chamber section 21 has a milk intake passage 28 and a milk outlet passage 29 therein and detachably connected to the nipple-ends 30 of these passages are the companion sections of the milk-flow conduit 14, whereby the milk flows from the teat cup 15 to the control unit chamber 26 and thence to the milk-receiving can. Centrally of this milk chamber, the intake passage 28 terminates in a port 31 which is open during the normal milking operation but which is adapted to be automatically closed by the diaphragm 25 when the flow of milk from the cow is reduced to a predetermined minimum. Suitable vents or bleeders 30ª are provided between the conduit-sections 14 and the attaching nipples 30 to facilitate the breaking of the vacuum in the milk-flow line when the milking operation is automatically completed from a given quarter of the cow's bag.

The vacuum control chamber 27 has a vacuum intake passage 32 having its outer or nipple-end 33 connected to the source of vacuum by the companion manifold branch tube 19ª, while its inner-end terminates in a port 34 communicating with such chamber through a valve-supporting cage 35 formed integrally with the chamber-forming section 21. Guided for vertical movement on this cage is the stem 35ª of an exhaust valve 36 for controlling the port 34, a spring 37 normally urging the valve toward its closed position. At its other end the valve stem has a head 38 thereon which normally abuts against the opposing side of the diaphragm 25, and the normal relation of the parts is such that the diaphragm has sufficient tension to overcome that of the spring 37 to retain or hold the valve 36 in its open position in readiness to build up a vacuum in the chamber 27 when the milking machine is connected for operation. However, when the diaphragm is distended in a direction away from the valve head, due to a variation in vacuum in the respective chambers 26, 27, then the exhaust valve will be closed by its spring and the vacuum in the chamber 27 will be gradually reduced.

Also contained in the vacuum chamber 27 is a low vacuum release valve 39 of piston-like form which is guided for vertical movement in a valve cage 40 formed integrally with the body-section 22 and which controls an air intake port 41 opening into the atmosphere. A spring 42 normally urges the valve to its open position and it is displaced to a closed position by the suction pressure in the chamber.

An adjustable valve means is employed for controlling the stripping time of milking to suit individual farmers or dairy attendants and for this purpose we provide an adjustable needle valve 43 fitted in the body-section 22 for controlling an exhaust port 44 communicating with an air intake passage 45 opening into the atmosphere. A pointer 46 and scale 47 serve to facilitate the adjustment of this valve to govern the time element of reducing the vacuum pressure in the chamber 27 below that in the companion chamber 26 to thereby cause a distention of the diaphragm 25 to a position to bring it into closing relation with the milk intake port 31, and thus cut off the vacuum to the companion teat cup.

A check valve 48 is interposed in the auxiliary suction tube 18 which is normally spring-urged to its closed position but which is adapted to be opened by the suction when the milking machine is rendered operative. If desired, and in lieu of a common check valve, however, a similar check valve 49 may be applied to each of the control units, as shown in Figure 4, and in both installations such valve also functions as a governor in reducing the vacuum in the chamber 27 from 15 inches to approximately 12 inches. The vacuum in the vacuum control chamber 27, during the operation of the machine is at approximately 12 inches, while that in the milk flow chamber 26, is subject to vary.

In the operation of the device, the machine is connected to the source of vacuum in the usual manner to build up a partial vacuum in the vacuum chamber 27 of the respective control units to approximately 12 inches, at which pressure the low vacuum release valve 39 is in its closed position and the exhaust valve 36 assumes its normal open position. The respective teat cups 15 are then connected to the cow in the usual manner and a partial vacuum is thereupon built up in the milk flow chamber 26 of each control unit. As the milk starts flowing from the cow into the milk-receiving can 10, there is a variation in the partial vacuums in the companion chambers 26, 27 of each control unit, with the diaphragm 25 being partially distended in one direction at a given stroke of the milk pumping cycle to render the spring 37 operative to close the valve 36 and at a subsequent stroke of the cycle to cause the diaphragm to be partially distended in the opposite direction to again open said valve 36 and subject the chamber 27 to its normal suction pressure. When the flow of milk from any one of the quarters of the cow's bag is reduced to a predetermined rate or that quarter is milked out, the vacuum in the chamber 26 of the companion control unit is such that it will not permit the distention of the diaphragm in a direction to cause the opening of the valve 36. Hence, this valve remains closed by its spring pressure and the vacuum in the chamber 27 is gradually reduced because of the admission of atmosphere through the needle valve 43, the setting of the latter determining the stripping period desired in completing the milking of the companion quarter of the cow's bag. When the vacuum in this chamber 27 is thus reduced to approximately six inches, the low vacuum release valve 39 is automatically opened by the spring 42 to a low additional atmosphere to enter said upper chamber through the port 41. Thereupon, the diaphragm, due to the differential in pressures in the companion chambers 26, 27, is smartly distended to the position shown in Figure 5, where it closes the milk intake port 31, shutting off the vacuum at the companion teat cup and causing it to drop by gravity from the cow's teat. When the teat cup drops, its hose connection 14 folds over the oblique mouth of the companion cover-intake tube 13, thereby sealing off the vacuum between the milk flow chamber of the control unit and the receptacle, and permitting atmosphere to be admitted through vents 30ª to the chamber 26 which allows the diaphragm 25 to return to its normal position and open the valve 36 in readiness to start the next milking operation.

For the purpose of quickly building up the partial vacuum in the device and holding the vacuum in the chamber 27 for a predetermined time period at the start of the milking operation, we preferably provide a leaf-suspended valve 50 in operative relation to the needle valve control port 44 and having a flexible connection, such as a spring 51, to a piston 52 operating in a dash pot or cylinder 53 formed in the body-section 22. This valve is normally held open by its suspension leaf, but when the vacuum is built up in the chamber 27, the piston 52 is displaced outwardly of its dash pot and the valve is correspondingly moved to its closed position. The valve is held in this closed position until the air in the dash pot is displaced to equalize the pressure at opposite ends of the piston, when the valve-suspension leaf restores the valve to its normally open position.

We claim as our invention:

1. The combination with a milking machine having teat connections for conducting the milk by vacuum from the cow to a milk-receiving can, of automatically controlled, vacuum-responsive means including diaphragm-divided vacuum and milk flow chambers interposed in vacuum and milk flow communication with the vacuum source and said teat connections, respectively, for individually shutting off the vacuum to the teat connections and the flow of milk therethrough when the surge of milk from the companion quarter of the cow's bag substantially ceases, said automatic means including an adjustable air intake control element operatively associated with the vacuum chamber for governing the stripping period desired in completing the milking of the companion quarter of the cow's bag.

2. Means for automatically controlling the operation of milking machines having teat connections, comprising control units individually interposed in the teat connections thereof and each including a body having a diaphragm therein forming at one side thereof a chamber including an inlet and an outlet through which the milk flows from the companion quarter of the cow's bag to the receptacle and at its opposite side a second chamber adapted for connection to a source of vacuum, and valve means in said second chamber governed in part by said diaphragm and responsive to the change of vacuum therein caused by a reduction of the flow of the milk from the companion quarter of the cow's bag for automatically shutting off the vacuum to and venting said second chamber to the atmosphere and causing the distended displacement of said diaphragm to a position to close the milk inlet in said first-named chamber and the teat cup to drop from the companion quarter of the cow's bag.

3. The combination with a milking machine of the pulsating type having teat connections for conducting the milk from the cow to a milk receiving can, of a vacuum-governed unit interposed in each connection and including a milk flow chamber through which the milk flows from the cow to the can and having a control port, a vacuum control chamber including a valved intake port and a valved vent, and means disposed in correlation to said chambers and in governing relation to said milk control port and said vacuum port and responsive to the variations of vacuum in such chambers for automatically closing the intake port of the vacuum chamber and the control port of the milk flow chamber for causing the release of the teat connection from the cow when the companion quarter of its bag is milked out.

4. The combination with a milking machine of the pulsating type having teat connections for conducting the milk from the cow to a milk receiving can, of a vacuum-governed unit interposed in each connection and including a milk flow chamber having a control port through which the milk flows from the cow to the can, a vacuum control chamber in vacuum communication with the machine and having a normally-open vacuum intake control valve and a normally vacuum-closed vent valve including a spring for causing its opening, and diaphragm-like means dividing said chambers and normally engaging said vacuum intake valve to hold it open and responsive to the reduced vacuum condition in said control chamber, when the surge of milk substantially ceases, to assume a distended position into the milk flow chamber to close its control port, said vacuum control valve having a spring for closing it when the diaphragm-like means is displaced therefrom.

5. The combination with a milking machine of the pulsating type having teat connections for conducting the milk from the cow to a milk receiving can, of a vacuum-governed unit interposed in each connection and including a milk flow chamber having a control port through which the milk flows from the cow to the can, a vented vacuum control chamber having a normally-open control valve and communicating with the source of vacuum, and a diaphragm separating said chambers and in governing relation to said control port and said control valve and responsive to the change of vacuum therein for causing, when the surge of milk through such connection substantially ceases, the closing of said vacuum control valve and the closing of said milk flow control port.

6. In a milking machine having teat connections for conducting the milk by vacuum from the cow to a milk-receiving can, of individual control units interposed in the teat connections and each including a hollow body having a vacuum-influenced, displaceable diaphragm fitted therein and forming a chamber at one side thereof in milk flow communication with the companion teat connection and including a normally-open milk control port and having a chamber at the opposite side thereof in communication with the source of vacuum of the milking machine and including a normally-open vacuum control port and an air intake port, and a valve for said vacuum control port normally urged in a direction to close the same, said diaphragm being normally disposed in operative relation to said valve for maintaining it open and being adapted to be displaced, when the surge of milk through the unit substantially ceases, to a position out of operative relation to said valve to cause its closing and into closing relation with the milk flow control port.

7. The combination with a milking machine of the pulsating type having teat connections for conducting the milk by vacuum from the cow to a milk-receiving can, of control units individually interposed in said teat connections and through which the milk flows from the respective quarters of the cow's bag to the receptacle, each of said units including a vacuum chamber having an intake port adapted for connection to a source of vacuum and a chamber in milk flow communication with the companion teat connections and having a control port, a normally-open vacuum control valve for said intake port, a valved port for governing the admission of atmosphere to the vacuum chamber, and a vacuum-influenced diaphragm disposed between said chambers in operative governing relation to said vacuum control valve and to said milk-flow control port for closing the same when the surge of milk from the companion quarter of the cow's bag substantially ceases.

8. The combination with a milking machine of the pulsating type having teat connections for conducting the milk by vacuum from the cow to a milk-receiving can, of a control unit interposed in each of the teat connections and including a chambered member having one chamber connected to the source of vacuum and the other in vacuum milk flow communication with the companion teat connection, and means in said chambered member and responsive to a change of vacuum therein for shutting off the vacuum to the first-named chamber and the flow of milk through the second-named chamber when the flow of milk is reduced as determined by a desired stripping period.

9. The combination with a milking machine of the pulsating type having teat connections for conducting the milk by vacuum from the cow to a milk-receiving can, of a control unit interposed in each of the teat connections and including a hollow body having a vacuum-influenced diaphragm therein dividing the same into opposing chambers, one chamber being adapted for connection to a source of vacuum and the other chamber being in milk flow communication with the companion teat connection, means in said chambers and controlled by said diaphragm for shutting off the vacuum thereto and flow of milk therethrough at such time as the companion quarter of the cow's bag is milked out, and an adjustable air intake valve for said vacuum chamber for governing the action of the diaphragm and for determining the stripping period of the milking operation.

10. Means for automatically controlling the operation of a milking machine having teat connections for conducting the milk by vacuum from the cow to a milk-receiving can, comprising a control unit interposed in each of the teat connections and including a hollow body having a vacuum-influenced diaphragm therein dividing the same into opposing chambers, one chamber being adapted for connection to a source of vacuum and having vacuum and vent control valves therein, and the other chamber being in milk flow communication with the companion teat connection and having a normally open milk flow control port therein in operative relation to said diaphragm to be closed thereby when the flow of milk from the companion quarter of the cow's bag substantially ceases.

11. The combination with a milking machine having milk-conveying conduits including teat cups thereon for connection to the cow's teats, of vacuum-governed control units interposed in said conduits for individually breaking the vacuum to such cups when the companion quarters of the cow's bag are milked out and automatically causing the release of the cups from the cow's teat, each of said units including a milk intake port and a vacuum communicating port, a control valve for said vacuum port, and vacuum-responsive means disposed in correlation with said milk intake port and said valve for governing their closing when the flow of milk from the companion quarter of the cow's bag substantially ceases.

12. The combination with a milking machine having milk-conveying conduits including teat cups thereon for connection to the cow's teats, of vacuum-governed control units interposed in said conduits for individually breaking the vacuum to such cups when the companion quarters of the cow's bag are milked out and automatically causing the release of the cups from the cow's teats, each of said units including a milk intake port and a vacuum communicating port, a control valve for said vacuum port, a spring for urging said valve to its closed position, and vacuum-responsive, displaceable means disposed in correlation with said milk intake port and said valve for governing their closing when the flow of milk from the companion quarter of the cow's bag substantially ceases, said means in its normal non-displaced position retaining said control valve in its open position against the tension of said spring.

13. The combination with a milking machine having milk-conveying conduits including teat cups thereon for connection to the cow's teats, of vacuum-governed control units interposed in said conduits for individually breaking the vacuum to such cups when the companion quarters of the cow's bag have been milked out and automatically causing the release of the cups from the cow's teats, each of said units including non-communicating milk flow and vacuum control chambers, a milk intake port in communication with the companion milk-conveying conduit and opening into said milk flow chamber, a vacuum communicating port in said vacuum chamber, a control valve for said vacuum port, a normally-open, vacuum-governed air intake valve in said vacuum chamber, and a vacuum-responsive diaphragm dividing said chambers and disposed in correlation with said milk intake port and said control valve for governing their closing when the flow of milk from the companion quarter of the cow's bag substantially ceases.

14. The combination with a milking machine having milk-conveying conduits including teat cups thereon for connection to the cow's teats, of vacuum-governed control units interposed in said conduits for individually breaking the vacuum to such cups when the companion quarters of the cow's bag have been milked out and automatically causing the release of the cups from the cow's teats, each of said units including a milk intake port and a vacuum communicating port, a control valve for said vacuum port, vacuum-responsive means disposed in correlation with said milk intake port and said valve for governing their closing when the flow of milk from the companion quarter of the cow's bag substantially ceases, and a regulating valve for admitting atmosphere to each unit for controlling the stripping time of milking.

15. In a device of the character described, a hollow body composed of opposing, chamber-forming sections adapted to be detachably coupled in sealed relation, a vacuum-responsive diaphragm disposed between and separating the companion chamber-forming sections, one of said sections being adapted for interflow communication with a liquid-conveying conduit and having an intake port opening into the chamber thereof, and the companion chamber-forming section having a passage therein adapted for connection to a source of vacuum and terminating in a port opening into the chamber thereof, and a valve for controlling said vacuum port, said diaphragm being disposed in operative relation to the liquid intake port and said valve to govern the opening of the latter in one position thereof and the closing of said intake port in another position thereof.

16. In a device of the character described, a hollow body composed of opposing, chamber-forming sections adapted to be detachably coupled in sealed relation, a vacuum-responsive diaphragm disposed between and separating the companion chamber-forming sections, one of said sections being adapted for interflow communication with a liquid-conveying conduit and having an intake port opening into the chamber thereof, and the companion chamber-forming section having a passage therein adapted for connection to a source of vacuum and terminating in a port opening into the chamber thereof, a valve for controlling said vacuum port including a spring for normally urging it to a closed position, and a normally-open vacuum-governed release valve for establishing communication between the vacuum chamber and the atmosphere, said diaphragm being disposed in operative relation to the vacuum port valve and the intake port to govern the closing of the latter in one position thereof and in another position thereof to maintain said vacuum port valve open against the tension of its spring.

17. A device of the character described, a hollow body composed of opposing, chamber-forming sections adapted to be detachably coupled in sealed relation, a vacuum-responsive diaphragm disposed between and separating the companion chamber-forming sections, one of said sections being adapted for interflow communication with a liquid-conveying conduit and having an intake port opening into the chamber thereof, and the companion chamber-forming section having a passage therein adapted for connection to a source of vacuum and terminating in a port-opening into the chamber thereof, a valve for controlling said vacuum port including a spring for normally urging it to a closed position, a normally-open, vacuum-governed release valve for establishing communication between the vacuum chamber and the atmosphere, said diaphragm being disposed in operative relation to the vacuum port valve and the intake port to govern the closing of the latter in one position thereof and in another position thereof to maintain said vacuum port valve open against the tension of its spring, and an adjustable needle valve fitted in the vacuum chambered section for governing the admission of atmosphere thereto.

ALBERT G. PERKINS.
RAOUL DU QUETTE.

REFERENCES CITED

The following references are of record in the file of this patent:

UNITED STATES PATENTS

| Number | Name | Date |
|---|---|---|
| 938,857 | Henrichsen | Nov. 2, 1909 |
| 1,109,800 | Sorensen | Sept. 8, 1914 |
| 1,183,080 | Kricke | May 16, 1916 |
| 1,276,803 | Paarmann | Aug. 27, 1918 |
| 1,387,983 | Hofmeister | Aug. 16 1921 |
| 1,773,726 | Deming | Aug. 26, 1930 |
| 2,121,549 | McNeal | June 21, 1938 |
| 2,192,548 | Gundersen | Mar. 5, 1940 |
| 2,307,066 | Paulus | Jan. 5, 1943 |
| 2,366,144 | Griswold | Dec. 26, 1944 |

FOREIGN PATENTS

| Number | Country | Date |
|---|---|---|
| 53,077 | Sweden | Nov. 22, 1922 |